United States Patent

Fowler

[15] 3,683,410
[45] Aug. 8, 1972

[54] RECTILINEAR RECORDING ARRANGEMENT FOR DIRECT WRITING OSCILLOGRAPHS

[72] Inventor: Leslie E. Fowler, Arlington Heights, Ill.

[73] Assignee: Beckman Instruments, Inc.

[22] Filed: Aug. 5, 1970

[21] Appl. No.: 61,117

[52] U.S. Cl. ............................346/117 A, 346/139 C
[51] Int. Cl. ...............................................G01d 5/02
[58] Field of Search...................346/117 A, 117 R, 139 C, 139 R, 346/140; 74/103

[56] References Cited

UNITED STATES PATENTS

| | | | |
|---|---|---|---|
| 2,129,483 | 9/1938 | Deventer | 178/11 |
| 3,115,382 | 12/1963 | Morse | 346/117 A X |
| 3,188,651 | 6/1965 | Offner | 346/117 A |
| 3,434,159 | 3/1969 | Erdman | 346/139 C |
| 3,346,871 | 10/1967 | Fowler | 346/139 C |

FOREIGN PATENTS OR APPLICATIONS 1,203,388   10/1965   Germany..............346/117 A

*Primary Examiner*—Joseph W. Hartary
*Attorney*—Mason, Kolehmainen, Rathburn & Wyss

[57] ABSTRACT

An electrically conductive ink tube having an insulating tip portion adapted to engage the chart paper is hingedly or slidably mounted in the free end of a rotatable pen body. Means are provided defining a downwardly opening guide slot positioned above the chart and transversely thereof. The ink tube carries a guide member which rides in the guide slot and forces the tip portion of the ink tube to move in a straight line in response to rotary movement of the pen body. A flat strip resistance element is insulatingly positioned within the guide slot and a contact member associated with the guide member is biased upwardly into engagement with the resistance element by means of a coil spring which also biases the tip portion of the ink tube downwardly against the chart paper. Electrical connection to this contact member is established through the ink tube which is insulated from the pen body.

18 Claims, 10 Drawing Figures

3,683,410

PATENTED AUG 8 1972

INVENTOR:
LESLIE E. FOWLER

BY Mason, Kolehmainen, Rathburn & Wyss
ATTORNEYS

PATENTED AUG 8 1972

INVENTOR:
LESLIE E. FOWLER
BY Mason, Kolehmainen
Rathburn & Wyss
ATTORNEYS

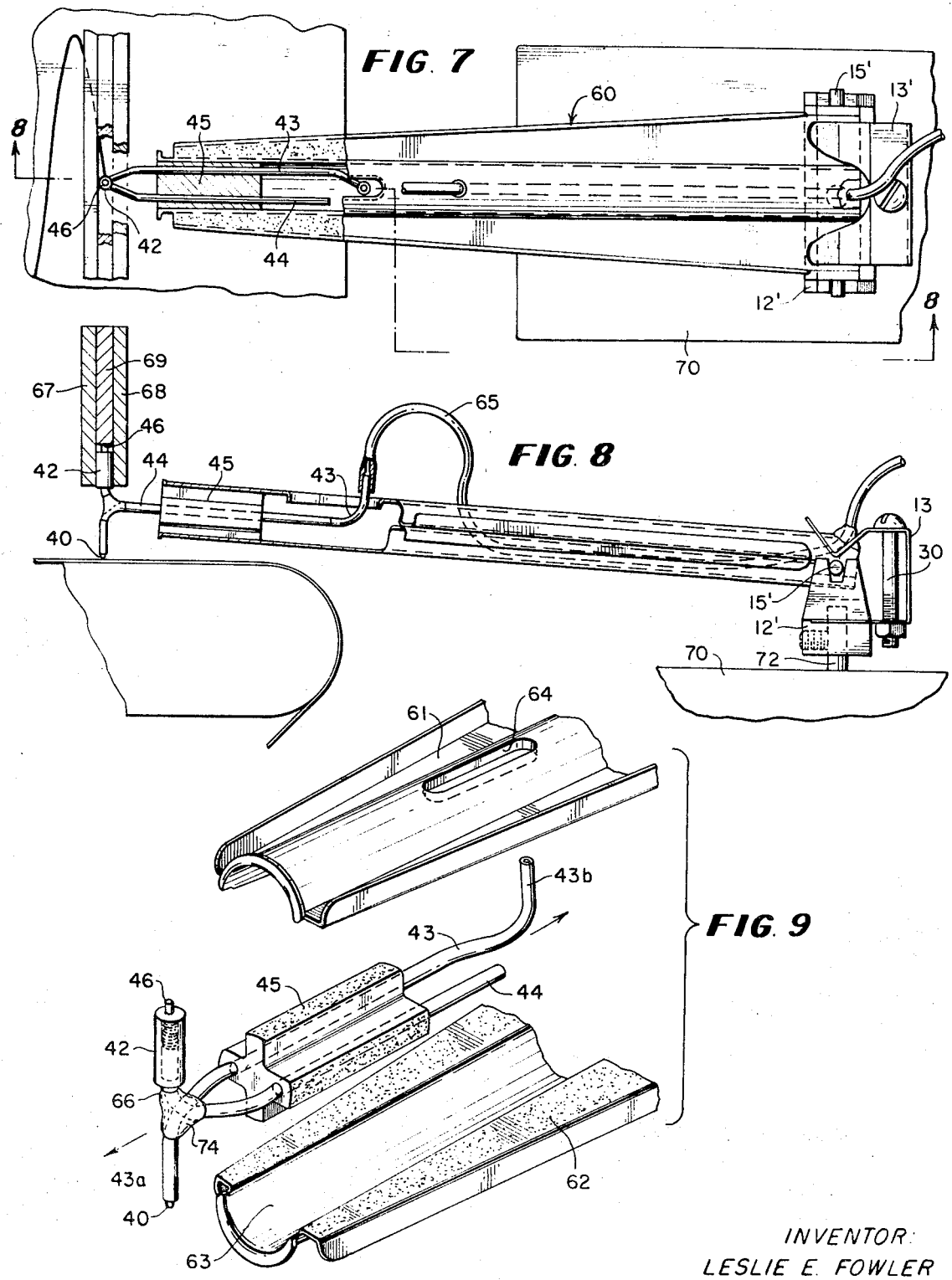

3,683,410

RECTILINEAR RECORDING ARRANGEMENT FOR DIRECT WRITING OSCILLOGRAPHS

The present invention relates to direct writing oscillographs or recorders, and, more particularly, to a rectilinear recording arrangement for such oscillographs whereby the pen tip is constrained to move in a straight line in response to rotary motion of the pen body.

Certain arrangements have been heretofore proposed for causing movement of the recorder pen tip of oscillographic type of recorders in a rectilinear or straight line manner in response to oscillatory movement of a galvanometer type pen motor. One such arrangement is shown in Offner U.S. Pat. No. 3,188,651. In this patent rectilinear movement of the recording pen is obtained by a spring loaded sliding contact which engages a potentiometer resistance element extending along a transversely placed rectilinear member. The voltage produced at this sliding contact thus depends upon the position of the recording pen and is employed as a feedback voltage to balance the signal voltage at the input.

While the arrangement shown in Offner U.S. Pat. No. 3,188,651 is generally suitable for its intended purpose, it has certain disadvantages. First, visibility of the pen tip during recording is poor due to the fact that the support for the potentiometer resistance element is positioned over the portion of the chart paper immediately adjacent to and ahead of the recording pen tip. Furthermore, since the potentiometer resistance element is exposed and is positioned relatively close to the chart paper and the recording pen tip, contamination of the resistance element, as by ink splattering, or the like, can occur which results in a loss of contact between the sliding contact and resistance element and hence a loss of record trace. Also, the use of sufficient spring bias against the stylus assembly to hold the stylus assembly against the rectilinear resistance element to achieve rectilinear motion results in substantial wear on both the sliding contact and the resistance element itself. In addition, pen tip pressure on the chart paper is, in arrangements such as shown in Offner U.S. Pat. No. 3,188,651, applied through the pen body by means of a spring adjacent the output shaft of the pen motor which limits the amount of pressure which can be applied to the pen tip without distorting the relatively weak ink tube which is pivotally connected to the end of the pen body.

It is, therefore, an object of the present invention to provide a new and improved rectilinear recording arrangement for direct writing oscillographs wherein one or more of the above discussed disadvantages of prior art arrangements is avoided.

It is another object of the present invention to provide a new and improved rectilinear recording arrangement for direct writing oscillographs wherein pen tip position feedback is obtained while providing substantially increased visibility of the recorder chart in the vicinity of the pen tip during the recording operation.

It is a further object of the present invention to provide a new and improved rectilinear recording arrangement for direct writing oscillographs wherein pen tip position feedback is obtained by means of a resistance element which is substantially shielded from ink splattering and other contaminating factors.

It is a still further object of the present invention to provide a new and improved rectilinear recording arrangement for direct writing oscillographs in which pen tip position feedback is provided while substantially decreasing wear on the resistance element and its associated sliding contact.

It is another object of the present invention to provide a new and improved rectilinear recording arrangement for direct writing oscillographs wherein the pen tip is constrained to move in a straight line by guidance within a vertically extending slot and without the use of any lateral spring bias.

It is a further object of the present invention to provide a new and improved rectilinear recording arrangement for direct writing oscillographs of the position feedback type wherein the downward force applied at the pen tip and the sliding contact pressure are equal.

It is another object of the present invention to provide a new and improved rectilinear arrangement for direct writing oscillographs wherein pressure is applied to the support pivots of the pen body in an amount sufficient to faithfully transmit output torque of the pen motor to the pen body and the pressure necessary to hold the pen tip against the chart paper is applied directly over the pen tip, thereby resulting in improved trace quality.

Briefly, in accordance with one aspect of the invention, an electrically conductive ink tube, having an insulating tip portion adapted to engage the chart paper, is hingedly or slidably mounted in the free end of an oscillatory pen body attached to a pen motor of the galvanometer or moving coil type. Means are provided defining a downwardly opening guide slot positioned above the chart and transversely thereof. The ink tube carries a guide member which rides in the guide slot and forces the tip portion of the ink tube to move in a straight line in response to oscillatory movement of the pen body. A flat strip resistance element is insulatingly positioned within the guide slot and a contact member associated with the guide member is biased upwardly into engagement with the resistance element by means of a coil spring which also biases the tip portion of the ink tube downwardly against the chart paper. Electrical connection to this contact member is established through the ink tube which is insulated from the pen body.

The invention, both as to its organization and method of operation, together with further objects and advantages thereof, will best be understood by reference to the following specification taken in connection with the accompanying drawings in which:

FIG. 7 is a plan view of a further alternative embodiment of the invention;

FIG. 8 is a side view of the arrangement of FIG. 7; and

FIG. 9 is an exploded view of a portion of the arrangement of FIG. 7.

Figure 1:
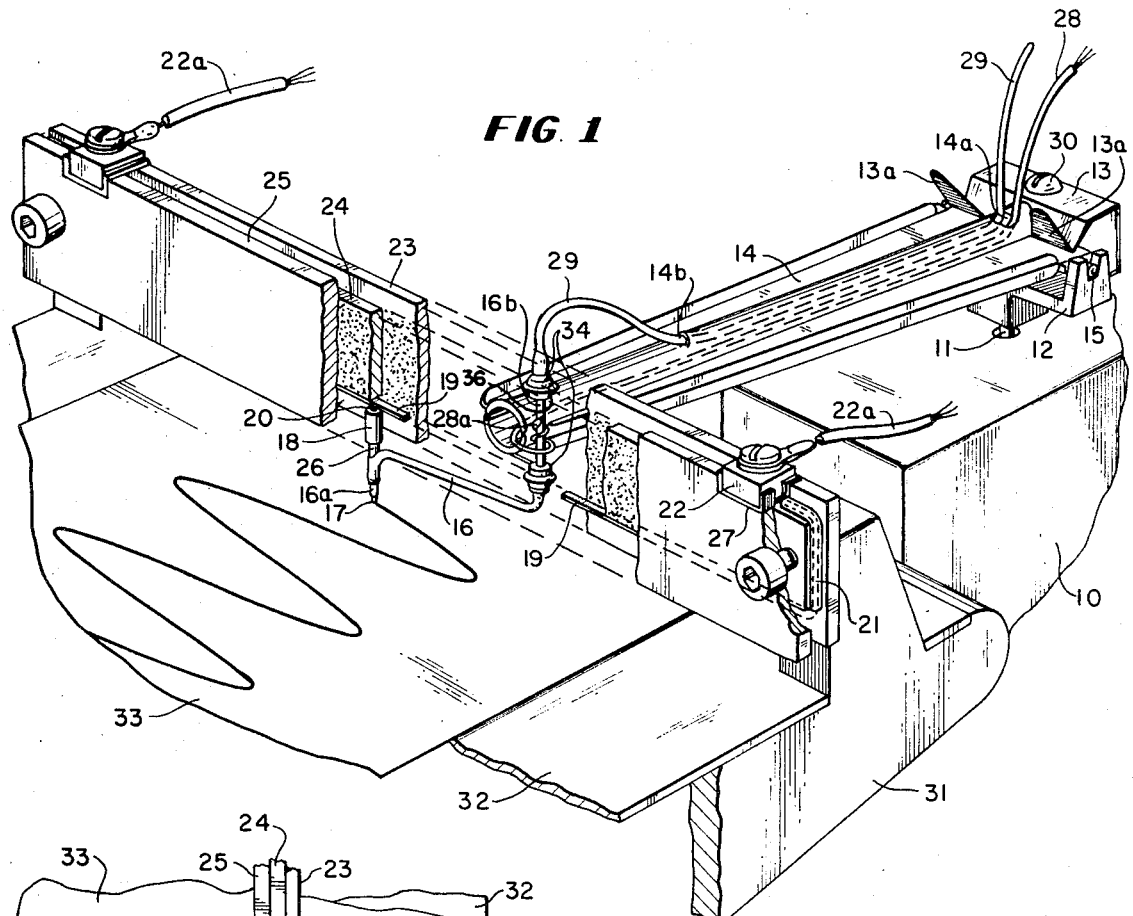
FIG. 1 is a perspective view of a rectilinear recording arrangement for direct writing oscillographs embodying features of the present invention.
Figure 2:
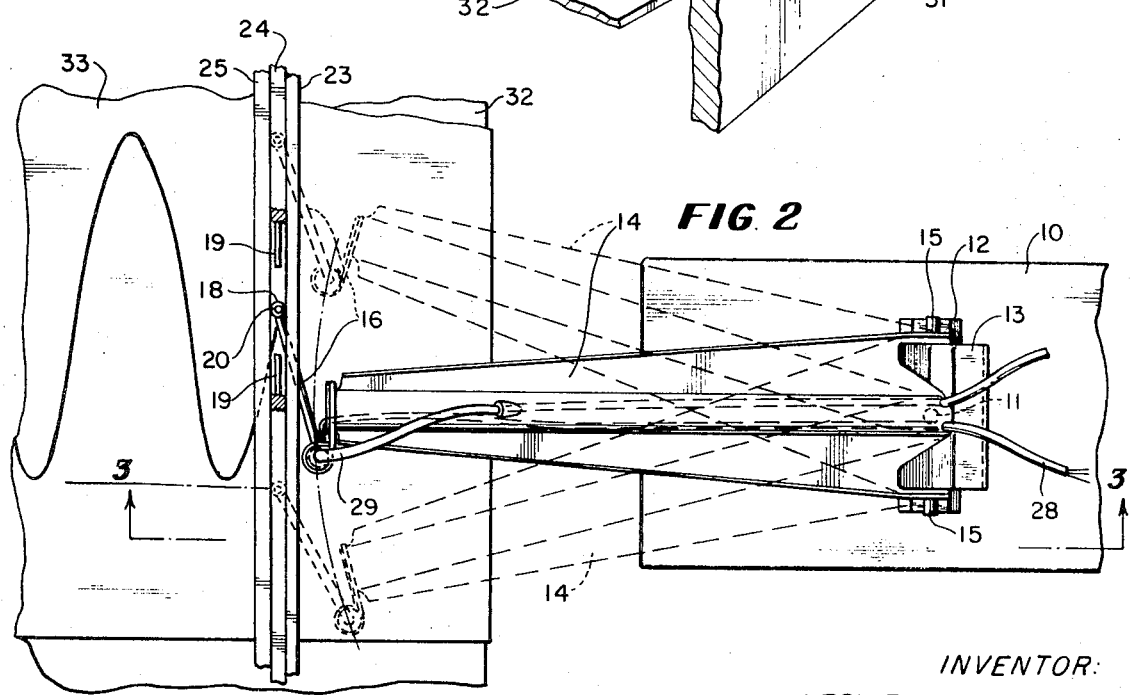
FIG. 2 is a plan view of the arrangement of FIG. 1.

Referring now to the drawings and more particularly to FIGS. 1 to 5, inclusive, thereof, the present invention is therein illustrated in conjunction with a pen motor, indicated generally at 10, which may be of the rotatable galvanometer coil type and is provided with an output shaft 11 which oscillates or rotates in accordance with an electrical input signal applied to the pen motor 10, as will be readily understood by those skilled in the art.

A pen body cradle 12 is secured to the upper end of the pen motor output shaft 11 and is provided with a pair of spaced V-bearing supports adapted to receive a pair of transversely extending pivot pins 15 provided at the rear end of a hollow tubular pen body 14. A spring clip member 13 is secured to the cradle 12 by means of screws 13b and is provided with a pair of ear portions 13a which engage the pen body 14 directly over the pivot pins 15 so as to provide a force holding the pins 15 in their V-shaped bearings with sufficient force to faithfully transmit the output torque of the pen motor 10 to the pen body 14 at high pen velocities without twisting or lifting of the pins 15 within the V-bearing supports of the cradle 12.

An electrically conductive ink tube 16 is pivotally connected to the forward end of the pen body 14 and is provided with a pen tip portion 16a perpendicular to the chart paper 33 in the end of which is secured a sapphire or synthetic ruby pen tip 17 which is adapted to engage the chart paper 33 on the writing table 32 of the oscillograph or recorder. An open ended extension tube or guide member 26 is secured to the portion 16a of the ink tube 16 by any suitable means such as the silver solder joint 26a in such manner that the extension tube 26 is concentric with the vertically extending tip portion 16a of the ink tube 16. A guide bushing 18, of insulating material and having a low coefficient of friction, is press fitted onto the upper end of the extension tube 26 and as adapted to ride in a downwardly opening guide slot formed by a pair of flat steel bars 23 and 25, which are spaced apart by means of an intervening flat steel bar 24. The bars 23, 24 and 25 are precision ground so as to provide a very accurately defined and rigid guide slot for the guide bushing 18, this guide slot extending transversely of the chart paper 33. Preferably, the diameter of the guide member 18 is chosen to have minimum clearance within this guide slot consistent with free movement of the guide member 18 therewithin.

The ink tube 16 is provided with a vertically extending offset end portion 16b which is positioned within a pair of bearings 34 which are held in vertically spaced relationship by means of loop portions 36 formed in the ends of a U-shaped wire 37 secured to the outer end of the pen body 14. Accordingly, the ink tube 16 is pivotally connected to the outer end of the pen body 14 in offset relation to the center line thereof so that the pen tip portion 16a of the ink tube 16 is constrained to move in a straight line as the guide bushing 18 moves within the guide slot between the bars 23, 25. As the pen body 14 oscillates from the rest position shown in FIG. 2 in full lines, to the extreme positions shown in dotted lines in this figure, the pen tip portion 16a thus moves in a straight line as defined by the guide bars 23, 25. The oscillator or rotary movement of the pen motor output shaft 11 is thus converted into rectilinear movement of the pen tip 16a. In this connection it will be noted that no springs or biasing members are employed to accomplish rectilinear motion of the pen tip 16a, since the guide member 18 simply rides within the guide slot defined by the vertically extending bars 23, 25 and guides the pen tip 16a in the desired straight line relationship as the pen body 14 oscillates. It will also be understood that the maximum amplitude of oscillation of the pen body 14 is chosen to give the desired channel width of the recorded signal on the chart paper 33, it being understood that this maximum amplitude of oscillation is held within suitable limits such that the ink tube 16 maintains an acute angle with respect to the transverse end plane of the pen body 14. Also, as the length of the pen body 14 is increased the arc traveled by the vertically extending hinge pin portion 16b of the ink tube 16 becomes flatter, as will be evident from FIG. 2 of the drawings.

While the guide member 18 and guide slot formed by the bars 23, 25 operate to constrain the pen tip portion 16a to the desired rectilinear motion, it is also necessary to provide a suitable downward pressure on the pen tip portion 16a so that the sapphire or synthetic ruby pen tip 17 is held against the chart paper 33 on the writing table 32 with the desired writing pressure.

In accordance with an important feature of the invention, this force is produced while at the same time providing an electrical position feedback signal which accurately represents the position of the pen tip 16a. More particularly, a cylindrical contact member 20 is slidably positioned within the open end of the extension tube 26 and extends through a slip fit opening 18a in the insulating bushing 18. A coil spring 25 is positioned between a collar 20a formed in the contact member 20 and the upper end of the extension tube 26 so as to exert an upward force on the contact member 20. This contact member is thus urged into sliding engagement with a flat strip resistance element 19 when the pen tip 17 is in contact with the chart paper 33. The element 19 is insulatingly mounted on the bottom edge of the bar 24 by means of the adhesive material 24a so that the resistance strip 19 is insulated from the steel bars 23, 24 and 25. Preferably, the material 24a is in the form of an insulating tape of 0.0005 inch thickness having an acrylic adhesive coating of 0.0015 inch thickness on both sides thereof. The tape positions the resistance element 19 accurately relative to the bottom edge of the bar 24 and holds this element in place while insulating it from the bar 24. The adhesive on the tape is cured by heating after the element 19 is properly positioned on the bar 24.

The upper end of the contact member 20 is urged into sliding engagement with the resistance strip 19 by the coil spring 35 which also exerts an equal but downwardly directed force on the pen tip portion 16a which holds the sapphire pen tip 17 against the chart paper 33 with the desired writing pressure. The contact member 20 is preferably of a suitable precious metal alloy, such as a palladium, platinum, gold, silver and copper alloy, which has good electrical contact and wear characteristics with respect to the flat strip resistance element 19. This resistance element is preferably on an alloy consisting of 74.5 percent nickel, 20 percent chromium, 2.75 percent aluminum and 2.75 percent copper. In one embodiment the coil spring 35 was chosen to provide a contact pressure and writing pressure of approximately 17 grams nominal although this pressure may obviously be varied to accommodate different writing conditions and chart papers.

It will be noted that the force exerted by the coil spring 35 is directly in line with the vertically extending tip portion 16a of the ink tube 16 and downward pressure on the pen tip portion 16a is not achieved by any spring member engaging an intermediate point of the pen body 14. The spring 13 functions solely to hold the pivot pins 15 in their V-bearings with sufficient force to faithfully transmit output torque of pen motor 10 to the pen body 14. Accordingly, the vertical stiffness requirements of the pen body 14 are reduced while at the same time removing the possibility of distortion of the pivoting ink tube 16 if pressure is applied to the pen body forward of the pivot bearings 15. Due to the offset condition of the pen tip 17 relative to the centerline of the pen body 14 distortion of ink tube 16 will cause pen tip 17 to be other than perpendicular to the chart paper 33, resulting in poor quality recording.

Electrical connection to the ends of the flat strip resistance element 19 is provided by extending the ends of this resistance element upwardly around the end of the middle bar 24, which is shorter than the bars 23, 25. A piece of insulating material 21 is placed over each end of the resistance strip 19 to prevent this resistance element from contacting the steel bars 23, 24 and 25. A terminal block 22 is positioned in a notch formed in the bars 23, 25 and is insulated therefrom by means of an insulating member 27, the end of the resistance element 19 being secured to the terminal block 22 by any suitable means. Accordingly, electrical connection can be made to either end of the resistance element 19 through suitable conductors 22a. A suitable voltage source, which is preferably regulated, is connected by means of the conductors 22a to the ends of the resistance element 19 so that a voltage is produced at the contact member 20 which accurately represents the position of the pen tip portion 16a as the pen body 14 is rotated. This pen position feedback voltage signal is employed to balance the signal voltage applied to one input of a suitable differential amplifier arrangement, the output of this differential amplifier being coupled to the pen motor 10 through suitable driver electronics, as will be readily understood by those skilled in the art. Any suitable amplifier arrangement, such as one of those disclosed in Offner U.S. Pat. No. 3,188,651, may be employed to provide a self-balancing follow-up system suitable to drive the pen motor 10, insofar as the present invention is concerned.

It will be noted that the flat bars 23, 24 and 25 are rigidly mounted to the side walls 31 of the recorder so as to provide a sturdy transverse guide slot arrangement for the guide member 18 attached to the pen tip portion 16a, so that precise rectilinear motion of the pen tip is achieved. Furthermore, this guide slot is economically manufactured without requiring the machining of long grooves or the like by simply precision grinding the flat steel bars 23, 24 and 25 to the desired tolerances to provide a downwardly opening guide slot which is accurately dimensioned to control movement of the guide member 18. By so mounting the steel bars 23, 24 and 25 a structure is provided for supporting the resistance element 19 at a precise height parallel to the writing table 32 and transverse to the chart paper 33. These bars are preferably secured together by means of a suitable adhesive rather than by the use of bolts or the like, so that deformation of the bars resulting from punched holes is avoided and a precisely aligned guide slot for the member 18 is provided.

In order to supply ink to the sapphire pen tip portion 17, the ink tube 16 is hollow and is connected to a suitable plastic ink tube 29 which extends from a suitable ink source through an opening 14a in the pen body 14, forwardly through the hollow pen body 14 and out of an opening 14b formed in the top surface of the pen body 14, the end of the tube 29 being connected to the upper end of the vertically extending offset ink tube portion 16b. Ink is thus supplied through the tube 29 and through the ink tube 16 to the pen tip portion 17 so as to produce the desired trace on the chart paper 33. Since the upper end 16b of the ink tube 16 oscillates through only a small arc with respect to the end of the pen body 14, the plastic ink tube 29 has sufficient flexibility to accommodate this oscillatory movement without breaking the connection between the end of the tube 29 and the upper end of the ink tube portion 16b.

In order to provide a pen tip position feedback signal proportional to the point at which the contact member 20 engages the resistance strip 19, the ink tube 16 and extension tube 26 are electrically conductive and electrical connection is established from the contact member 20 through the coil spring 35 to the end of the extension tube 26. If desired, the bottom end of the coil spring 35 may be soldered to the upper end of the extension tube 26 to provide a positive electrical connection between the contact member 20 and the extension tube 26. The extension tube 26 and contact member 20 are insulated from the steel guide bars 23 and 25 by means of the insulating guide bushing 18. Also, the pen tip 17 is electrically nonconductive so that if the chart paper 33 is torn and the pen tip portion 17 contacts the metal writing table 32, the ink tube 16 is not grounded, and loss of control of the recording pen is prevented.

The vertically extending portion 16b of the conductive ink tube 16 is electrically insulated from the pen body 14 by means of the insulating bushings 34. However, an electrical conductor 28, which extends through the opening 14a in the pen body 14 and out through the open end of this pen body is connected to the ink tube portion 16b, as indicated by the solder joint 28a, the conductor 28 being given a turn or two around the vertically extending ink tube portion 16b to accommodate the slight oscillatory motion of the ink tube portion 16b as the pen body 14 is moved through its maximum range of travel without exerting any spring bias or torque on the ink tube portion 16b. The voltage appearing at the conductor 28 thus corresponds to the voltage appearing at the point of contact of the contact member 20 with the resistance element 19 and this voltage is employed as a feedback signal in any suitable self-balancing servo arrangement to control the signal applied to the pen motor 10.

Figure 3:
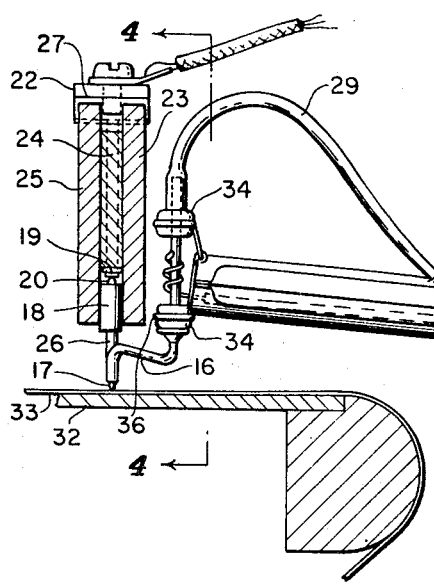
FIG. 3 is a sectional view taken along the lines 3—3 of FIG. 2.
Figure 3A:
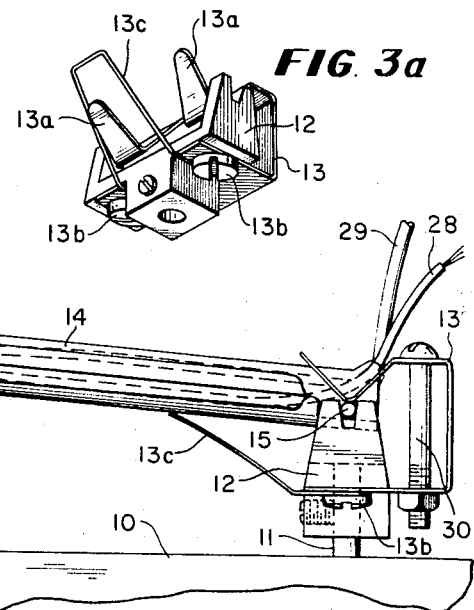
FIG. 3a is a fragmentary perspective view of the pen body mounting and supporting arrangement of FIG. 3.
Figure 4:
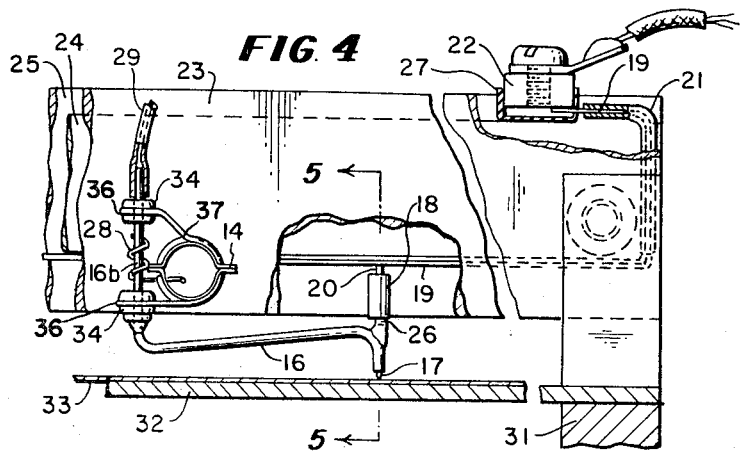
FIG. 4 is a sectional view taken along the lines 4—4 of FIG. 3.
Figure 5:
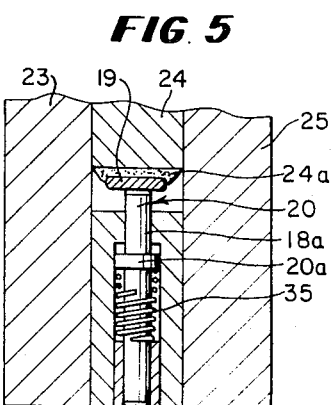
FIG. 5 is a sectional view taken along the lines 5—5 of FIG. 4.

In the arrangement shown in FIGS. 1 to 5, inclusive, the ink tube 16 and the guide assembly carried by the extension tube 26 can be moved downwardly out of the guide slot between the bars 23 and 25 by slight downward pressure on the pen tip 17 if the writing table 32 is removed from its normal position. To prevent such accidental disengagement of the guide 18 from the guide slots between the bars 23 and 25, a U-shaped spring wire form 13c (FIGS. 3 and 3a) of sufficient strength to support the mass of the pen body 14, ink tube 16 and ink tube 29 when the table 32 is removed, is fastened to the cradle 12 by means of the screws 13b. However, the upward pressure exerted by the spring 13c is very slight and is readily overcome by the coil spring 35 which exerts a downward force on the pen tip 17 sufficient to hold it against the chart paper 33 during normal operation.

Figure 6:
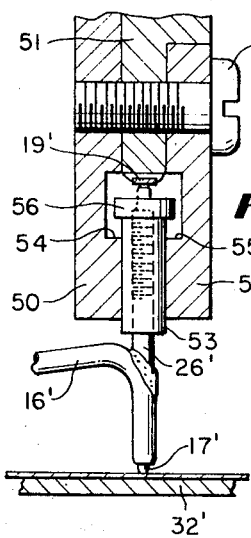
FIG. 6 is a sectional view, similar to FIG. 5, of an alternative embodiment of the invention.

In the alternative embodiment shown in FIG. 6 a different arrangement is provided for retaining the guide member 18. In this embodiment the guide bars 50 and 52 are spaced apart by means of an intermediate guide bar 51 so as to provide a downwardly extending guide slot for the guide bushing 53. Each of the guide bars 50 and 51 is provided with an internal groove which defines internal shoulders 54 and 55, respectively, against which a collar portion 56 of enlarged diameter on the guide member 53 may seat when the writing table 32' is removed. Since the guide member 53 is secured to the upper end of the extension tube 26', the entire pen tip assembly associated with the ink tube 16' is held in place by engagement of the collar 56 with the shoulders 54, 55. It is desirable that the bars 50 and 51 be adhesive joined and bar 52 be attached by bolts 57, so that the front bar 52 and the guide member 53 can be readily removed. In other respects, the embodiment of FIG. 6 is similar to the rectilinear recording arrangement of FIGS. 1 to 5, inclusive, corresponding elements being given the same reference numerals with a prime added.

In FIGS. 7 to 9, inclusive, of the drawings, there is shown an alternative embodiment of the present invention wherein the ink tube is slidably mounted in the free end of the pen body rather than being pivotally connected to the pen body as in the embodiment of FIGS. 1 to 5, inclusive. More particularly, in the arrangement of FIGS. 7 to 9, inclusive, a pen body indicated generally at 60 is mounted in a cradle 12' connected to the output shaft 11' of pen motor 10'. The pen body 60 comprises upper and lower channel shaped sections 61 and 62 which when secured together by any suitable means define a cylindrically shaped passageway 63 within which a bearing block 45 of low friction material is secured by any suitable means such as a suitable adhesive. The bearing block 45 has slidably mounted therein a first conductive ink tube 43 which is provided with an end portion 43a which is perpendicular to the chart paper and terminates in a sapphire or synthetic ruby tip portion 40 adapted to engage the chart paper. The rear end of the tube 43 terminates in a vertically extending portion 43b which extends through a clearance slot 64 formed in the pen body section 61, a plastic ink tube 65 being connected to the end of the upstanding ink tube portion 43b. The ink tube 65 has a loop portion to permit sliding movement of the tube 43 and extends from the rear of the pen body 60 to a suitable ink supply. The bearing block 45 also slidably receives a second member 44 which is provided with a forward vertically extending portion 66 which corresponds to the extension tube 26 in the embodiment of FIGS. 1 to 5, inclusive, an insulating guide bushing 42 is secured to the upper end of the tube portion 66 and rides in a downwardly opening guide slot formed by two flat steel bars 67 and 68 which are spaced apart by an intervening steel bar 69. In the embodiment of FIGS. 7 to 9, inclusive, the pen motor 70 is of the type in which a torque restoring device, which may be either electrical or mechanical, is used to return the output shaft 72 of the motor to its zero position. Such a pen motor drive arrangement is different from the position feedback arrangement of the embodiment of FIGS. 1 to 5, inclusive, in that no electrical feedback signal corresponding to pen tip position is required. Accordingly, in the embodiment of FIGS. 7 to 9, inclusive, the flat strip resistance element 19 in the embodiment of FIGS. 1 to 5, inclusive, is omitted, and a nonconductive contact member 46 of a material having a low coefficient of friction is provided in place of the electrical contact member 20 of the embodiment of FIGS. 1 to 5, inclusive. The upper end of the button 46 rides on the bottom surface of the middle bar 69 and is spring biased by means of a coil spring similar to the spring 35 so as to provide a downwardly exerted force on the pen tip 40 to provide the desired writing pressure.

In operation, when the pen body 60 is moved away from its zero center position, the guide member 42 is restrained to move in a rectilinear manner by the guide bars 67, 68 and the tubes 43 and 44 slide outwardly through the bearing block 45. As this occurs, the ink tube 65 and upstanding portion 43b of the ink tube 43 move forwardly in the slot 64. The ink tube 43 is hollow and carries ink to the pen tip portion 40 as the guide assembly moves within the slot formed by the bars 67 and 68. The contiguous portions of the tubes 43 and 44 are jointed together by means of a suitable silver solder joint 74, or the like, to provide a unitary assembly which slides freely in and out of the bearing block 45 as the guide member 42 moves in the desired rectilinear path. In this connection it will be noted that in the arrangement of FIGS. 7 to 9, inclusive, the distance traveled by the pen tip 40 is linearly proportional to the angular deflection of the pen body 60. For small deflections of the pen body 60 such linearity is adequate to provide the accuracy required for most recording operations, and hence the extremely accurate positioning of the pen tip by pen position feedback utilizing the resistance element 19 is not required. However, it will be understood that in situations where the pen body 60 undergoes a wide deflection, or where extreme accuracy is required, the arrangement of FIGS. 7 to 9, inclusive, can be modified to include a resistance element, similar to the resistance element 19 of the embodiment of FIGS. 1 to 5, inclusive. In such instance, a contact member, similar to the contact member 20 of FIGS. 1 to 5, inclusive, is mounted on the extension tube 66 and an electrical connection is made to the rear end of the conductive tube 44 through a suitable flexible conductor loop (similar to the loop provided for the ink tube 65) to accommodate travel of the tube 44 as the pen body 60 is deflected. It will also be noted that the embodiment of FIGS. 7 to 9, inclusive, is particularly suited for multiple pen applications since the pen bodies may be mounted relatively close together. In the embodiment of FIGS. 7 to 9, inclusive, the diameter of the guide bushing 42 is the limiting factor whereas in the embodiment of FIGS. 1 to 5, inclusive, the bushings 38 and the pen body 14 limit the pen spacing to a substantially larger width for the same pen deflection.

While all of the described embodiments of the present invention have been illustrated in conjunction with a suitable ink source, either pressurized or non-pressurized, for making the chart paper 33, it will be understood that insofar as the rectilinear guiding arrangement of the present invention is concerned, other arrangements for making the chart paper may be employed. For example, either pressure marking or electrical marking may be employed. In the case of pressure marking the jewel tip portion 17, for example, is solid and pressure sensitive paper, such as micro encapsulated paper in which tiny beads of suitable chemicals are broken under the pressure of the jewel tip portion and interact, either with themselves or with the paper, is used to provide a suitable mark. Other forms of pressure marking such as breaking through the coating on the paper, or other well-known arrangements may also be employed it being understood that in the event of such pressure marking the coil spring 35 in the embodiment of FIGS. 1 to 5, or the corresponding spring in the embodiment of FIGS. 7 to 9, inclusive, may be increased somewhat to provide the required pressure for a given type of paper.

For electrical marking, an insulated wire may be positioned within the ink tube 16 and have an exposed end portion which would extend into the opening of the jewel tip portion 17 to a point adjacent the recording paper 33. Electrical marking may be provided either by chemical reaction in the paper or by arcing through the paper to the metallic writing table 32, as will be readily understood by those skilled in the art. A similar electrical marking arrangement could be employed in the embodiment of FIGS. 7 to 9, inclusive, in which an insulated electrical wire would be positioned in the tube 43 with a bare end portion extending into the jewel tip portion 40. In either instance, an insulated sleeve is preferably positioned within the vertically extending tip portion 16a or 43a, respectively, to prevent the bar portion of the electrical marking conductor from contacting the conductive ink tube 16a or 43a, respectively, adjacent the insulated jewel tip portion 17 or 40.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a recorder of the type which includes a pen motor having an output shaft which is rotatable in accordance with an electrical signal to be recorded on a moving chart, the combination of
   an elongated pen body connected to the pen motor output shaft,
   an ink tube extending from the outer end of said pen body,
   means defining a downwardly opening guide slot positioned transversely of the chart,
   follower means adapted to move in said guide slot including means for electrically insulating said follower means from said means defining said guide slot and connected to said ink tube, and
   means for biasing said follower means downwardly so that the tip of said ink tube is held against the chart.

2. The combination of claim 1, wherein said ink tube is provided with a tip portion which extends perpendicularly to the chart, and said biasing means acts in the direction of extension of said tip portion.

3. The combination of claim 1, wherein said ink tube is pivotally connected to the outer end of said pen body.

4. The combination of claim 1, wherein a resistance member is positioned adjacent said guide slot, said follower means includes a contact member adapted to engage said resistance member, and said biasing means exerts a force on said contact member urging the same into engagement with said resistance member.

5. The combination of claim 1, further comprising a cradle connected to said output shaft and provided with a pair of spaced apart V-shaped bearings, said pen body provided with a pair of pivot pins positioned in said bearings and means for holding said pivot pins against said bearings with sufficient force to faithfully transmit torque output of said pen motor to said pen body.

6. In a recorder, the combination of
   means defining a downwardly opening guide slot positioned transversely of the recorder chart,
   a writing arm mounted for pivotal movement about an axis,
   a writing member mounted on the forward end of said arm and having a tip portion adapted to engage the chart and
   vertically extending guide means positioned in said guide slot to permit said tip portion to move only in a line defined by said guide slot as said writing arm is moved about said axis,
   said vertically extending guide means comprising a vertically extending member connected to said writing member and a vertically extending electrically insulating bushing mounted on said vertically extending member and positioned within said guide slot.

7. The combination of claim 6, wherein said vertically extending means further includes means for exerting a downward force on said vertically extending member to force said tip portion against the chart.

8. In a recorder, the combination of
   means defining a downwardly opening guide slot positioned transversely of the recorder chart,
   a writing arm mounted for pivotal movement about an axis,
   a writing member mounted on the forward end of said arm and having a tip portion adapted to engage the chart and
   vertically extending guide means positioned in said guide slot to permit said tip portion to move only in a line defined by said guide slot as said writing arm is moved about said axis, said vertically extending guide means including a vertically extending member connected to said writing member and means for exerting a downward force on said vertically extending member to force said tip portion against the chart, said vertically extending member comprising a tube and a bearing member slidably mounted in said tube, said force exerting means also exerting an upward force on said bearing member.

9. The combination of claim 8, wherein a resistance member is mounted in said guide slot and said bearing member is urged into engagement with said resistance member by said force exerting means.

10. The combination of claim 9, wherein said force exerting means comprises a coil spring positioned between said tube and said bearing member.

11. In a recorder, the combination of means defining a downwardly opening guide slot positioned transversely of the recorder chart, a writing arm mounted for pivotal movement about an axis, a writing member mounted on the forward end of said arm and having a tip portion adapted to engage the chart, vertically extending guide means positioned in said guide slot to permit said tip portion to move only in a line defined by said guide slot as said writing arm is moved about said axis, said guide slot being defined by a pair of transversely extending flat bars which are separated by an amount determined by a third flat bar positioned between said pair of bars, a resistance member insulatingly mounted on the edge of said third bar within said guide slot, and means including a contact member carried by said writing member for establishing electrical contact with said resistance member when said vertically extending guide means is positioned in said guide slot.

12. The combination of claim 11, wherein said resistance member is in the form of a flat strip and is spaced from said third bar by means of a tape of insulating material.

13. In a recorder, the combination of means defining a downwardly opening guide slot positioned transversely of the recorder chart, a writing arm mounted for pivotal movement about an axis, a writing member mounted on the forward end of said arm and having a tip portion adapted to engage the chart, and vertically extending guide means positioned in said guide slot to permit said tip portion to move only in a line defined by said guide slot as said writing arm is moved about said axis, said writing arm being provided with a pair of vertically spaced bearing members and said writing member being pivotally connected to said writing arm by means of an offset end portion positioned in said bearing members.

14. In a recorder, the combination of means defining a downwardly opening guide slot positioned transversely of the recorder chart, a writing arm mounted for pivotal movement about an axis, a writing member mounted on the forward end of said arm and having a tip portion adapted to engage the chart, vertically extending guide means positioned in said guide slot to permit said tip portion to move only in a line defined by said guide slot as said writing arm is moved about said axis and means for retaining said guide means within said guide slot when said tip portion does not engage the chart.

15. The combination of claim 14, wherein said writing member is slidably mounted in the end of said writing arm.

16. The combination of claim 14, wherein said writing member is electrically conductive and is pivotally mounted on the end of said writing arm but electrically insulated therefrom.

17. The combination of claim 14, wherein said guide slot is defined by a pair of transversely extending flat bars which are separated by an amount determined by a third flat bar positioned between said pair of bars.

18. The combination of claim 14, further comprising a resistance member mounted within said guide slot, a contact member carried by said writing member and in engagement with said resistance member and means for establishing electrical connection to said contact member through said writing member.

* * * * *